May 21, 1935. A. BERKNER 2,002,360
FASTENING AND BUTTONING MEANS FOR GARMENTS AND THE LIKE
Filed June 24, 1933
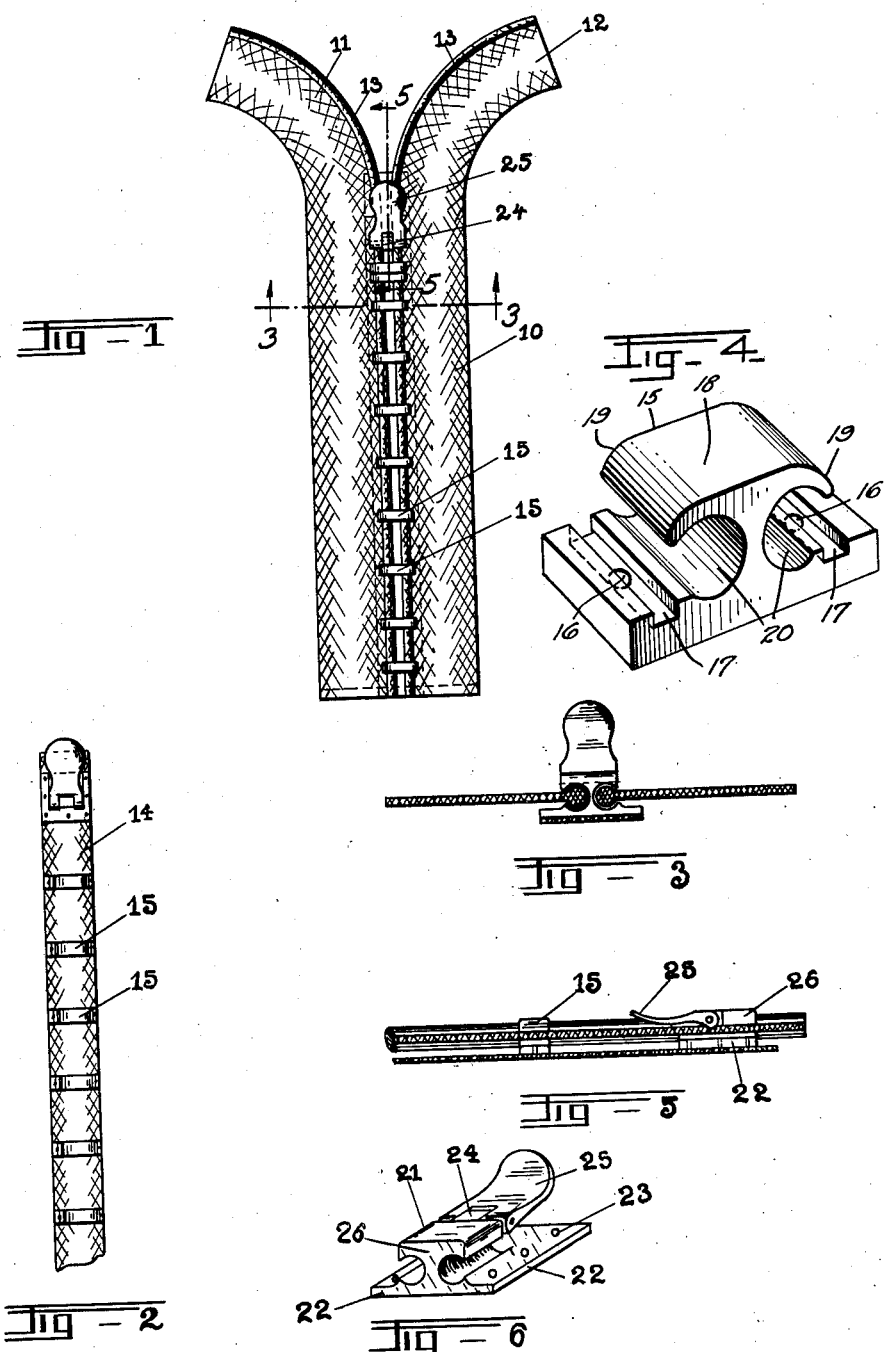
INVENTOR
Arthur Berkner
BY
ATTORNEY Patented May 21, 1935

2,002,360

UNITED STATES PATENT OFFICE 2,002,360

FASTENING AND BUTTONING MEANS FOR GARMENTS, AND THE LIKE

Arthur Berkner, Passaic, N. J.

Application June 24, 1933, Serial No. 677,363

2 Claims. (Cl. 24—207)

REISSUED

This invention relates to new and useful improvements in closing and fastening means for garments, underwear, shoes, bags and the like; and it has for its principal object to provide a device that will prove superior to those now in use on the market.

The said device is of such a construction that it may be adaptable for a good many purposes and consequently will have a wide scope of application.

Another advantage of the device is to the effect that the latter is simple to operate, sturdy and infallible in use, and may easily be repaired, if, after a long wear, some parts should be worn out.

As the device, although unique of conception, is very plain of construction, the cost of manufacturing should be proportionately low thereby assuring a great market for the same.

With the above and other objects in view, this invention consists of the novel features of construction, combination and arrangement of parts, hereinafter fully described, claimed and illustrated in the accompanying drawing forming part of this specification, and in which similar characters of reference indicate corresponding parts in all views, and in which:

Figure 1 is a plan view of my invention.

Figure 2 is a plan view of the sliding or manipulating member of my device showing the upper surface thereof.

Figure 3 is a sectional view on the line 3—3 of Figure 1, with the clasping member in released position. Figure 4 illustrates in detail one of the connecting members shown in Figure 2. Figure 5 is a longitudinal cross section, taken on the line 5—5 in Figure 1, while Figure 6 shows the key locking member detached.

Referring more particularly to the drawing, 10 indicates an object to which my device is made applicable; the present purpose of the said device being, as will appear evident, to open or close the flaps 11 and 12; the latter are with this end in view provided with seams 13, 13. Behind the said flaps is arranged a strip 14 of any kind of suitable material, as has been especially shown in Figure 2; the said strip 14 has attached thereto slidable fasteners 15, one of these being especially shown in Figure 4. The said fasteners have eyelets 16 therein for securing them, for instance by sewing to the said strip 14, and in addition the said fasteners are provided with grooves 17 to receive the thread or the cement or glue in case it should be desired to secure the fasteners 15 to the strip 14 in the said latter manner. The said fasteners 15 which are secured to the strip 14 at intervals, are formed with a roof portion 18, which in turn terminates in hook-formed edge portions 19, 19 on both sides thereof for engagement with the seams 13, 13 during manipulation of the device, as the said seams slide in two cylindrically formed openings 20, 20 upon each side of the member 15.

The sliding member 14 is at its lower end solidly secured to the flaps 11 and 12 which it is supposed to open or close, while at the upper end of the said sliding member 14 a key 21 is attached. The said key has side flanges 22 for securing it to the member 14, for instance by sewing; the apertures 23 being shown for the latter purpose. The said key has further an upper body portion 26 corresponding in shape to and serving a similar purpose as the fastener 15. At the downwardly extending end of the said key and pivotally secured to a centrally projecting ridge-member 24 is a tongue 25, which serves the purpose of releasing or fastening the upper end of the sliding member 14 relative to the flaps 11 and 12, according to whether it is desired to open or close the garment or object, the conventional opening of which is represented by the said flaps for the sake of illustration.

The releasing and fastening operation thus referred to is performed by cam means on the tongue 25, which when in the position shown in Figure 5 tightly grip the flaps 11 and 12 between the flanges 22 and the cam means.

It is obvious that changes may be made in the form, construction and arrangement of the several parts, as shown, within the scope of the appended claims, without departing from the spirit of the invention, and I do not therefore wish to limit myself to the construction and arrangement shown and described herein.

What I claim as new, and desire to secure by Letters Patent of the United States, is:

1. A device of the class described, comprising, in combination, a pair of flap-members to be fastened together, seams upon the edges of the latter, a strip of pliable material arranged beneath the said flap-members and having its lower end integrally connected thereto, fasteners secured to the said strip at intervals, each of the said fasteners having an integral body portion comprising a bottom piece and a downwardly curved top portion, a wall securing said bottom piece and top portion together, and having both sides formed with concave portions adapted to receive said seams therein, the said bottom piece being made with grooves and apertures therein to receive sew-on-threads, whereby to connect the fasteners to said strip of pliable material, the sew-on-threads passing through said apertures formed at the bottom of the grooves arranged in said fasteners, and a manipulating key mounted upon the other end of said strip, said key being formed with a body and a tongue pivotally secured thereto for gripping the flap members so as to arrest the movement of the strip, relative to the flap-members.

2. A device of the class described, comprising, a pair of flap-members to be fastened together, seams upon the edges of the latter, a strip of pliable material arranged beneath the said flap-members, and having its lower end integrally connected thereto, fasteners secured to the said strip at intervals, each of the said fasteners having an integral body portion comprising a bottom piece made with grooves and apertures therein to receive sew-on-threads, whereby to connect the fasteners to said strip of pliable material, the sew-on-threads passing through said apertures formed at the bottom of the grooves arranged in said fasteners, and a downwardly curved top portion, a wall securing said bottom piece and top portion together and having both sides formed with concave portions adapted to receive said seams therein, a manipulating key-member connected to the upper end of the strip of pliable material, and comprising an enlarged fastening member formed with a central projection and having a thumb piece pivotally secured to said projection for engaging the flap members, substantially as shown and described.

ARTHUR BERKNER.